United States Patent Office 3,574,685
Patented Apr. 13, 1971

3,574,685
MANUFACTURE OF MAGNETIC PARTICLES BY REACTING IRON, COBALT, OR NICKEL SALTS WITH OXALIC ACID SALTS IN DIALKYL SULFOXIDE
Robert S. Haines, Boulder, Colo., assignor to International Business Machines Corporation, Armonk, N.Y.
No Drawing. Filed Jan. 14, 1969, Ser. No. 791,162
Int. Cl. H01f 10/02
U.S. Cl. 117—240      3 Claims

ABSTRACT OF THE DISCLOSURE

This invention relates to the preparation of high coercivity, finely divided acicular magnetic metal, alloy, or oxide particles by precipitation of oxalates of iron, nickel, cobalt, or mixtures of these metal oxalates from a bath containing dialkyl sulfoxide, preferably dimethyl sulfoxide. Oxalic acid or a soluble salt of oxalic acid which provides oxalate ions in solution is reacted with a soluble metal salt of iron, nickel, or cobalt dissolved in the bath. Precipitation is caused by the addition of water to the dialkyl sulfoxide bath. After separating and drying, the precipitate is decomposed, either by heat alone or by reduction with a reducing gas at elevated temperatures to produce metal particles which are oblong in shape and which vary in size from about 0.1 micron to 1.0 micron.

FIELD OF THE INVENTION

This invention relates to a novel method for preparing acicular magnetic particles suitable for use in magnetic recording media, permanent magnets, magnetic cores, and in magnetically responsive fluid suspensions such as magnetic or electrostrictive clutch coupling or the like.

SUMMARY OF THE INVENTION

More particularly, the invention relates to a method of making fine magnetic metal, alloy, or oxide particles by dissolving a metal salt of nickel, cobalt, iron, or mixtures of these salts in a dialkyl sulfoxide bath, preferably dimethyl sulfoxide, reacting the metal salts with oxalic acid or a soluble oxalate which dissolves in the dialkyl sulfoxide bath, precipitating the oxalate reaction product by adding water to the bath, separating the precipitate, and decomposing the precipitate, either by heating alone or by reduction with a reducing gas at elevated temperatures to produce metallic particles of oblong structure in a narrow range of particle sizes varying between about .01 to 1.0 micron.

In preparing the reaction mixture, any soluble iron, cobalt, or nickel salt or a mixture of these salts may be dissolved in the dialkyl sulfoxide to make a separate solution for addition to a solution of oxalic acid in dialkyl sulfoxide or in a small amount of water. In addition, other ingredients may be added to the bath. Upon mixing these separate solutions, a clear solution in dialkyl sulfoxide is formed. Precipitation is effected by adding water to the dialkyl sufoxide reaction bath. Alternatively, an aqueous solution of iron, cobalt, or nickel salts may be added to dialkyl sulfoxide which contains oxalic acid or a soluble oxalate salt dissolved therein. It is preferred to keep the amount of water in the system to a minimum, since the precipitation step by water addition is more efficient when water is added to a clear combined reaction mixture.

This precipitated metal oxalate is separated and decomposed to the corresponding metal oxide by heating at elevated temperatures, preferably 350–400° C. The oxide so formed may then be reduced with a reducing gas such as hydrogen or carbon monoxide at elevated temperatures of from about 225° C. to about 450° C. to provide metal or metal alloy particles which are acicular in shape. Alternatively, and preferably, the oxidation step may be eliminated and the same result achieved by reduction alone.

Acicular ferrous oxalate, cobaltous oxalate, or nickelous oxalate particles are formed by dissolving any soluble ferrous, cobaltous, or nickelous salt, such as the chloride or sulfate, in dimethyl sulfoxide and adding a water-soluble oxalate (e.g., sodium, potassium or ammonium oxalate), dissolved in a dimethyl sulfoxide water solution. By mixing ferrous salts with cobalt salts or nickel salts, or both, acicular ferrous oxalate modified with cobalt or cobalt and nickel can be formed.

Modification of ferrous oxalate with cobalt is useful for producing particles from which magnets or cores can be made, since the magnetization of an iron cobalt alloy particle is dependent on (a) the ratio of the iron to cobalt, and (b) the unit particle size (see the Japanese Journal of Applied Physics, vol. 6, No. 9, pp. 1096–1100, September 1967). The maximum magnetization for iron-cobalt alloy particles is obtained for a composition of 60% iron and 40% cobalt, and this ratio is preferred in comparing different methods of preparation which vary the particle size of the unit particle of oxalate.

In the reduction opertaion to obtain the ferromagnetic metal or metal alloy particles, the size of the acicular oxalate particle acts only as a skeleton for the much smaller unit particles (see Zairyo, vol. 14, No. 144, pp. 736–740, September 1965), and determines the size of the unit particle as well as the reduction temperature. Low reduction temperatures, of the order of 325° C., produce unit particles that are not agglomertaed or sintered and have the coericivcity of the discrete unit particle. High reduction temperatures (500–550° C., for example) produce agglomerated or sintered unit particles that have a lower coercivity than the discrete unit particle.

To prevent loss in coercivity, the decomposed unit crystals are preferably reduced at a temperature of between 375 and 400° C. for 4 hours, with a hydrogen flow of 125 cc./min. In this manner, differences in coercivity are minimized and based only on differences in size of the unit particle produced from the reduction of the oxalate skeletons of various sizes.

The use of dialkyl sulfoxide allows one to coat the acicular oxalate particles with non-magnetic organic film-forming water-insoluble materials to inhibit agglomeration. These coating materials may be organic polymers or non-magnetic fillers which have known utility in the preparation of magnetic recording media and magnetic responsive fluids, such as are used in the electromagnetic clutch of Rabinow, U.S. Patent 2,575,360, or the electrostrictive fluid compositions of the type shown in Winslow, U.S. Patents 2,417,850 or 2,886,150. Lubricant materials, such as the fluorinated polymers of Fitch, U.S. Patent 3,002,596, may also be introduced into the dialkyl sulfoxide bath.

In addition to organic binders, lubricants such as silicone oil, graphite, molybdenum disulfide, oleyl butyrate ester, oleic acid amide, and the like, may be used in preparing magnetic record media such as video tapes, computer tapes, and sound tapes.

In preparing magnetic recording media (for example, magnetic tape for sound recording), the gamma iron oxide in acicular form obtained from the decomposition step may also be used together with a film-forming polymer binder.

The iron oxide-cobalt oxide particles recovered from the decomposition step may similarly be used as the magnetic component of video tape, recording tape, or computer tape.

Mixtures of iron-cobalt metal particles may be used with the binder in the preparation of magnetic recording media.

Typical, but not limiting, binders for these various recording media are polyesters, cellulose esters and ethers, vinyl chloride, vinyl acetate, acrylate and styrene polymers and co-polymers, polyurethanes, polyamides, aromatic polycarbonates as (for example) those produced from 2,2-bis-(4-hydroxyphenyl)-propane and polyphenyl ethers as (for example) those produced by oxidative coupling of 2,6 dimethyl phenol.

In addition to dialkyl sulfoxide, a wide variety of solvents may be used for forming a dispersion of the fine particles and binders. Organic solvents, such as ethyl, butyl, and amyl acetate; isopropyl alcohol; dioxane; acetone; methylisobutyl ketone; cyclohexanone; and toluene are frequently used for this purpose. The particle-binder dispersion may be applied to a suitable substrate by roller coating, gravure coating, knife coating, extrusion, or spraying of the mix onto the backing or by other known methods. The specific choice of non-magnetic support, binder, solvent, or method of application of the magnetic particles to the support will vary with the properties desired and the specific form of the magnetic recording medium being produced.

In preparing recording media, the magnetic particles usually comprise about 40–90% by weight of the film layer applied to the substrate. The substrate is usually a flexible paper, polyester or cellulose acetate material, although rigid base material of plastic or metal is more suitable for some uses.

In preparing magnetic cores and permanent magnets, the products of the examples which follow are mixed with non-magnetic plastic or filler in an amount of 33–50% by volume of the finished magnetic metal; the particles aligned in a magnetic field and the mixture pressed into a firm magnet structure. Alignment of the particles may be accomplished in an externally applied D.C. magnetic field of about 4000 gauss or more, and fields up to 28,000 gauss may be used. Pressures may vary widely in forming the magnet, and pressures up to 100,000 p.s.i. have been used commercially.

During the water solution-precipitation step which follows the combination of oxalate ion and metal salt in the dialkyl sulfoxide bath, it may be advantageous to employ an ultrasonic field which aids in crystallizing single metal salts or co-crystallizing mixtures of metal salts and in producing the acicular metal oxalate in very fine and uniform particle size range, which, in turn, leads to superior magnetic results.

The ultrasonic field may be formed by commercially available devices, such as the "Rapisonic" ultrasonic device sold by Sonic Engineering Corporation, Stamford, Connecticut, which vibrates a blade at a frequency of 22K c.p.s.; or by piezoelectric crystal transducers (e.g., quartz, barium titanate, and the like) which convert electric energy into ultrasonic waves between 10K c.p.s. and 1M c.p.s.; or by other transducers which are described in the leterature. Low intensities of the order of 0.1–0.7 watt per square centimeter of ultarsonic energy are generally adequate to disperse the precipitate and prevent particle agglomeration by vibrational motion in the dialkyl sulfoxide bath.

Any soluble salt of iron, cobalt, or nickel may be used, and the chlorides, nitrates, sulfates, and acetates are representative salts which are readily available and have been used with good results.

For reasons of economy and availability dimethyl sulfoxide is the preferred dialkyl sulfoxide, but diethyl sulfoxide, dipropyl sulfoxide, dibutyl sulfoxide, and diisobutyl sulfoxide may be used. Unsymmetrical sulfoxides may be used, such as methyl ethyl sulfoxide and isobutyl sulfoxide.

The foregoing and other objects, features, and advantages of the invention will be apparent from the following more particular description of preferred embodiments of the invention.

DESCRIPTION OF THE PREFERRED EMBODIMENTS

The following examples are given by way of pointing out critical aspects of the invention and preferred embodiments. All solutions and mixtures were made and agitated at room temperature.

Example 1A.—Complex formation between dimethyl sulfoxide and oxalic acid 3 g. of oxalic acid were dissolved in 10 g. of dimethyl sulfoxide. An infrared spectrum was carried out on the mixture immediately after mixing and the solution was formed. Twenty-four hours later, a second infrared spectrum was run. Based on these infrared spectra, there was no reaction between dimethyl sulfoxide and oxalic acid, for example, to form dimethyl oxalate. Compare Landgraf, U.S. Patent 3,186,829.

Example 1B.—Complex formation between dimethyl sulfoxide and dimethyl oxalate 3 g. of dimethyl oxalate were dissolved in 10 g. of dimethyl sulfoxide. An infrared spectrum was carried out on the mixture immediately after mixing and the solution was formed. Twenty-four hours later, a second infrared spectrum was run. Again, there was no reaction between the dimethyl sulfoxide and the dimethyl oxalate which was used in this portion of the example.

Example 1C.—Conditions for precipitation of Oxalic acid

The solution of oxalic acid in dimethyl sulfoxide from Example 1A, above, was added to a solution of 4 g. of $FeCl_2 \cdot 4H_2O$ in 100 ml. of dimethyl sulfoxide. A clear solution was formed. This clear solution was diluted with 1800 ml. of water and agitated. The very fine precipitate which was formed was washed with water and with methanol and dried at a temperature of 150° C. and then reduced at 400° C. with hydrogen for 4 hours to produce finely divided acicular particles having a particle size of about 0.04 to 0.06 micron, which were magnetic.

Example 2.—Effect of the presence of water in the dimethyl sulfoxide bath on particle size Example 2A.—No water added to bath.—In this example, no water was introduced into the dimethyl sulfoxide bath with any of the reactants and no water was added prior to the precipitation step.

11.9 g. of $FeCl_2 \cdot 4H_2O$ (0.06 mole) and 9.5 g. of $$CoCl_2 \cdot 6H_2O$$

(0.04 mole) were dissolved in 300 ml. of dimethyl sulfoxide. 9.9 g. of oxalic acid (0.11 mole) were dissolved in 300 ml. of dimethyl sulfoxide, and this clear solution was added to the above clear solution to produce a clear mixture with no precipitate. This solution was diluted with 2400 ml. of water and placed on a shaker for 24 hours, at which time the mixed iron-cobalt oxalate precipitate formed was washed twice with water and once with methanol, then dried in an oven at 150° C. for 1 hour and reduced at 400° C. with hydrogen for 4 hours. After reduction with hydrogen, the sample was cooled to 200° C. and carbon dioxide from a Dry Ice container was passed over it for 5 hours. The particles were oblong in shape; the particle size was from 0.04 to 0.06 micron; and, after analysis, the particles were found to contain 58% iron and 42% cobalt.

The following magnetic properties were determined with a Vibrating Sample Magnetometer (VSM) at an applied field strength of 4000 oersteds:

Ms—175 emu. (electromagnetic units per gram)
Hc—396 oe.

It was noted that the addition of water in increments instead of all at once to clear oxalate-metal salt solutions in dialkyl sulfoxide results in the precipitates taking longer to form.

Example 2B.—All aqueous systems.—11.9 g. of $$FeCl_2 \cdot 4H_2O$$

(0.06 mole) and 9.5 g. of $CoCl_2 \cdot 6H_2O$ (0.04 mole) were dissolved in 300 ml. of water. 9.9 g. of oxalic acid (0.11 mole) were dissolved in 300 ml. of water. This clear solution was added to the above clear solution and diluted with 2400 ml. of water. A precipitate started to form immediately after the aqueous oxalic acid was added to the aqueous solution of metal chlorides, whereas in the case of the dimethyl sulfoxide solutions, no precipitate started to form until fifteen minutes had elapsed. Thus, the Example 2A precipitate formed much more slowly than the Example 2B precipitate.

The resulting particles were oblong in shape; the particle size was 0.2–0.3 micron; and, after analysis, the particles were found to contain 64% iron and 36% cobalt.

The magnetic characteristics determined with the VSM were:

Ms—188 emu.
Hc—188 oe.

Example 2C.—Presence of water in the dimethyl sulfoxide bath.—16.7 g. of $FeSO_4 \cdot 7H_2O$ (0.06 mole) and 9.5 g. of $CoCl_2 \cdot 6H_2O$ (0.04 mole) were dissolved in 300 ml. of water. 9.9 g. of oxalic acid (0.11 mole) were dissolved in 300 ml. of dimethyl sulfoxide and added to the above aqueous solution. Then 2400 ml. of water was added and the solution was placed on a shaker for 24 hours. The resultant precipitate was washed, reduced, and carbon dioxide passed over it as above. The resulting particles were oblong in shape; the particle size range was from 0.4 to 1.1 microns; and the particles contained 65% iron and 35% cobalt. The resultant alloy particles had the following magnetic properties:

Ms—186 emu.
Hc—181 oe.

It is, thus, apparent from the example that when water is present in the system prior to the completion of mixing of the metal salt and the oxalate ion, the particles formed are substantially lower in coercivity and larger in size.

Example 3.—Preparation of 62% iron-38% cobalt particles from ammonium oxalate 11.9 g. of $FeCl_2 \cdot 4H_2O$ (0.06 mole) and 9.5 g. of $CoCl_2 \cdot 6H_2O$ (0.04 mole) were dissolved in 300 ml. of dimethyl sulfoxide. 15.7 g. of $(NH_4)_2C_2O_4 \cdot H_2O$ (0.11 mole) were dissolved in 300 ml. of dimethyl sulfoxide and mixed with the first solution above, to form a clear solution. Then 2400 ml. of water was added and the solution was placed on a shaker for 24 hours. The precipitate was washed twice with water, once with methanol, dried for 1 hour at 150° C., then reduced with hydrogen and carbon dioxide passed over it as in Example 2A. The resulting particles were oblong in shape; the particle size was from 0.04 to 0.06 micron; and, after analysis, the particles were found to contain 62% iron and 38% cobalt.

The particles had the following magnetic characteristics:

Ms—87.5 emu.
Hc—641 oe.

Example 4.—Preparation of 56% iron-44% cobalt particles; the effect of the presence of citric acid 11.9 g. of $FeCl_2 \cdot 4H_2O$ (0.66 mole) and 9.5 g. of $CoCl_2 \cdot 6H_2O$ were dissolved in 3000 ml. of dimethyl sulfoxide. 15.0 g. of citric acid and 9.9 g. of oxalic acid (0.11 mole) were dissolved in 300 ml. of dimethyl sulfoxide and mixed with the solution above. Then 2400 ml. of water was added and the solution placed on a shaker for 24 hours. The precipitate was washed twice with water, once with methanol, and dried for 1 hour at 150° C. Then it was reduced with hydrogen and carbon dioxide from Dry Ice was passed over it as the previous examples. The resulting particles were oblong in shape; the particle size was from 0.02 to 0.03 micron; and, after analysis, the particles were found to contain 56% iron and 44% cobalt.

The particles had the following magnetic characteristics:

Ms—202.6 emu.
Hc—803 oe.

When the citric acid was mixed with $FeCl_2 \cdot 4H_2O$ and with $CoCl_2 \cdot 6H_2O$ in dimethyl sulfoxide, no precipitate was formed with subsequent water addition. It was necessary to add oxalic acid to form a precipitate.

Example 5.—Preparation of cobalt-nickel-iron particles 1.19 g. of $NiCl_2 \cdot 6H_2O$ (0.005 mole), 7.96 g. of $FeCl_2 \cdot 4H_2O$, and 13.1 g. of $CoCl_2 \cdot 6H_2$ (0.055 mole) were dissolved in 300 g. of dimethyl sulfoxide. 9.9 g. of oxalic acid (0.11 mole) were dissolved in 300 g. of dimethyl sulfoxide and this solution was added to the solution above. Then 2400 ml. of water was added and the solution was placed on a shaker for 24 hours. The precipitate was washed twice with water, once with methanol, and dried for 1 hour at 150° C.; then reduced with hydrogen at 400° C. for 4 hours and carbon dioxide from Dry Ice was passed over it as in the previous examples. The resulting particles were oblong in shape; the particle size was from 0.18 to 0.20 micron; and, after analysis, the particles were found to contain 70% cobalt, 20% nickel, and 10% iron.

The particles had the following magnetic properties:

Ms—158 emu.
Hc—188 oe.

Example 6A.—Preparation of pure cobalt particles.—11.9 g. of $CoCl_2 \cdot 6H_2O$ (0.05 mole) were dissolved in 150 ml. of dimethyl sulfoxide, 4.9 g. of oxalic acid (0.055 mole) were dissolved in 150 ml. of dimethyl sulfoxide, and this solution was added to the above solution, diluted with 1200 ml. of water, and placed on a shaker for 24 hours. The precipitate was washed with water twice, washed with methanol once, and dried and reduce, and carbon dioxide passed over it as in the previous examples. The resulting particles were oblong in shape; the particle size was from 0.02 to 0.03 micron; and the particles were found to contain 100% cobalt.

The following magnetic characteristics were determined:

Ms—140.2 emu.
Hc—734 oe.

Example 6B.—Preparation of phosphorus-modified cobalt particles.—11.9 of $CoCl_2 \cdot 6H_2O$ (0.005 mole) were dissolved in 150 ml. of dimethyl sulfoxide. 2.0 g. of $NH_4H_2PO_4$ and 4.9 g. of oxalic acid (0.055 mole) were dissolved in 150 ml. of dimethyl sulfoxide, and this solution was added to the above solution, and diluted with 1200 ml. of water. Then the solution was stirred while being brought to a boil on a hot plate, where it boiled for 5 minutes. The resultant precipitate was washed twice with water and once with methanol, dried, reduced, and carbon dioxide was passed over it as in the above examples. The particles which resulted were oblong in shape; the particle size was from 0.03 to 0.04 micron; and, upon analysis, the particles were found to contain 99.8% cobalt and 0.2% phosphorus. The phosphorus content is a function of the hypophosphite ion concentration.

The particles had the following magnetic properties:

Ms—138 emu.
Hc—754 oe.

Example 7.—Preparation of manganese and cobalt-modified iron oxide

Besides preparing alloy particles by the method of Example 6B, above, one can also prepare modified oxides in the manner described below.

32.06 g. of $FeCl_2 \cdot 4H_2O$, 1.83 g. of $MnCl_2 \cdot 4H_2O$, and 1.07 g. of $CoCl_2 \cdot 6H_2O$ were dissolved in 200 g. of dimethyl sulfoxide. 12 g. of oxalic acid were dissolved in 200 g. of dimethyl sulfoxide. This solution was added to the first solution above to produce a clear solution from which no precipitate formed. To this clear solution was added 400 ml. of water and a mixed oxalate precipitate formed. The mixed oxalate precipitate was washed twice with water and once with methanol, and was then dried in an oven at 150° C. for 1 hour. The resultant powder was then heated in a furnace at 400° C. for 2 hours, with air passing over it. The powder particles were cubic in shape and the particle size was from 0.08 to 0.10 micron. Analysis showed that the particles were cobalt manganese-modified gamma iron oxide containing the equivalent of 90% modified gamma iron oxide, 5% cobalt, and 5% manganese. The powder particles had the following magnetic characteristics:

Ms—61.5 emu.
Hc—1100 oe.

Example 8.—Preparation of iron-cobalt alloys from sulfate salts 16.7 g. of $FeSO_4 \cdot 7H_2O$ (0.06 mole) and 11.25 g. of $CoSO_4 \cdot 7H_2O$ were stirred into 300 ml. of dimethyl sulfoxide. The cobaltous sulfate was not completely soluble. 9.9 g. of oxalic acid (0.11 mole) was dissolved in 300 ml. of dimethyl sulfoxide and added to the above mixture. Then 2400 ml. of water was added and the solution was placed on a shaker for 24 hours. The precipitate was washed, reduced, and carbon dioxide was passed over it, as described above. The resulting particles were oblong in shape; the particle size range was from 0.07 to 0.10 micron; and analysis showed that the particles contained 60% iron and 40% cobalt.

The resulting alloy particles had the following magnetic properties:

Ms—178 emu.
Hc—415 oe.

Example 9.—Preparation of 25% iron-75% cobalt alloy from mixed chloride and nitrate salts 11.93 g. of $FeCl_2 \cdot 4H_2O$ (0.06 mole) and 11.65 g. of $Co(NO_3)_2 \cdot 6H_2O$ (0.04 mole) were stirred into 300 ml. of dimethyl sulfoxide. 9.9 g. of oxalic acid (0.11 mole) were dissolved in 300 ml. of dimethyl sulfoxide and added to the above solution. Then 2400 ml. of water was added and the solution was placed on a shaker for 24 hours. The precipitate formed was washed, reduced, and carbon dioxide was passed over it as in the previous examples. The resulting particles were oblong in shape; the particle size range was from 0.07 to 0.10 micron; and the particles contained 25% iron and 75% cobalt.

The resulting alloy particles had the following magnetic properties:

Ms—155 emu.
Hc—177 oe.

Example 10.—Preparation of 56% iron-44% cobalt alloy 16.7 g. of $FeSO_4 \cdot 7H_2O$ (0.06 mole) and 11.65 g. of $Co(NO_3)_2 \cdot 6H_2O$ (0.04 mole) were stirred into 300 ml. of dimethyl sulfoxide. 9.9 g. of oxalic acid (0.11 mole) were dissolved in 300 ml. of dimethyl sulfoxide and added to the above to form a solution. Then 2400 ml. of water was added and the solution was placed on a shaker for 24 hours. The resultant precipitate was washed, reduced, and carbon dioxide was passed over it. The resulting particles were oblong in shape; the particle size range was from 0.04 to 0.05 micron; and the particles contained 56% iron and 44% cobalt.

The resulting alloy particles had the following magnetic properties:

Ms—122 emu.
Hc—573 oe.

Example 11.—Preparation of 60% iron-40% cobalt alloy from mixed sulfate and chloride salts 16.7 g. of $FeSO_4 \cdot 7H_2O$ (0.06 mole) and 9.5 g. of $CoCl_2 \cdot 6H_2O$ (0.04 mole) were stirred into 300 ml. of dimethyl sulfoxide. 9.9 g. of oxalic acid (0.11 mole) were dissolved in 300 ml. of dimethyl sulfoxide and added to the above to form a solution. Then 2400 ml. of water was added and the solution was placed on a shaker for 24 hours. The resultant precipitate was washed, reduced, and carbon dioxide was passed over it, as above. The resulting particles were oblong in shape; the particle size range was from 0.04 to 0.06 micron; and the particles contained 62% iron and 38% cobalt.

The resultant alloy particles had the following magnetic characteristics:

Ms—130 emu.
Hc—615 oe.

While there has been described and pointed out the fundamental novel features of the invention as applied to preferred embodiments, it will be understood that various omissions and substitutions and changes in the form and details of the invention illustrated may be made by those skilled in the art without departing from the spirit of the invention. It is therefore the intention thereof to be limited only as indicated by the scope of the following claims:

What is claimed is:

1. A method of manufacturing magnetic recording media comprising:
   dissolving a chloride, nitrate, sulfate or acetate salt of nickel, cobalt, iron, and mixtures thereof in a bath consisting essentially of dialkyl sulfoxide;
   reacting with oxalate ion dissolved in said bath;
   precipitating the metal oxalate by adding water to the bath;
   separating the precipitate;
   reducing with a reducing gas at elevated temperatures to recover finely divided metal particles;
   adding a non-magnetic binder to said magnetic particles in a solvent for the binder to form a dispersion;
   coating a base with said dispersion; and
   drying the coating.

2. A method as claimed in claim 1 wherein said dialkyl sulfoxide bath consists essentially of dimethyl sulfoxide.

3. A method for manufacturing magnetic recording media comprising:
   dissolving a chloride, nitrate, sulfate or acetate salt of nickel, cobalt, iron, and mixtures thereof in a bath consisting essentally of dialkyl sulfoxide;
   reacting with oxalate ion dissolved in said bath;
   precipitating the metal oxalate by adding water to the bath;

separating the precipitate;
heating the precipitate at 100–450° C. in the presence of oxygen to remove organic matter;
recovering the metal oxide;
adding a non-magnetic binder to said magnetic particles in a solvent for the binder to form a dispersion;
coating a base with said dispersion; and drying the coating.

References Cited

UNITED STATES PATENTS

| | | | |
|---|---|---|---|
| 2,991,198 | 7/1961 | Abeck et al. | 117—235 |
| 3,000,757 | 9/1961 | Johnston et al. | 117—63 |
| 3,031,341 | 4/1962 | Eschenfelder | 117—235 |
| 3,317,574 | 5/1967 | Morita et al. | 252—62.56 |
| 3,369,925 | 2/1968 | Matsushita et al. | 117—63 |

WILLIAM D. MARTIN, Primary Assistant

B. D. PIANALTO, Assistant Examiner

U.S. Cl. X.R.

117—235; 252—62.54

PO-1050
(5/69)

UNITED STATES PATENT OFFICE
CERTIFICATE OF CORRECTION

Patent No. 3,574,685      Dated April 13, 1971

Inventor(s) ROBERT S. HAINES

It is certified that error appears in the above-identified patent and that said Letters Patent are hereby corrected as shown below:

In the specification, Column 6, line 10, "(0.66 mole)" shou read --(0.06 mole)--; line 36, "$H_2$" should read --$H_2O$--; line 71, insert after "11.9" --g.--; line 71, "(0.005 mole) should read --(0.05 mole)--.

Signed and sealed this 20th day of July 1971.

(SEAL)
Attest:

EDWARD M. FLETCHER, JR.
Attesting Officer

WILLIAM E. SCHUYLER, JR.
Commissioner of Patents